United States Patent
Van dyck et al.

(10) Patent No.: US 9,173,419 B2
(45) Date of Patent: Nov. 3, 2015

(54) METHOD OF IMPROVING ANIMAL FEEDS USING HYDROLYZED LECITHINS

(71) Applicant: Kemin Industries, Inc., Des Moines, IA (US)

(72) Inventors: Stefaan Van dyck, Brasschaat (BE); Bart Vennekens, Laakdal (BE); Bruno Coppens, Heist-op-den-berg (BE); Filip Nuyens, Geel (BE)

(73) Assignee: Kemin Industries, Inc., Des Moines, IA (US)

(*) Notice: Subject to any disclaimer, the term of this patent is extended or adjusted under 35 U.S.C. 154(b) by 0 days.

(21) Appl. No.: 14/065,904

(22) Filed: Oct. 29, 2013

(65) Prior Publication Data

US 2014/0057016 A1   Feb. 27, 2014

Related U.S. Application Data

(62) Division of application No. 13/006,827, filed on Jan. 14, 2011, now Pat. No. 8,603,568.

(60) Provisional application No. 61/295,431, filed on Jan. 15, 2010.

(51) Int. Cl.
| | |
|---|---|
| *A23K 1/16* | (2006.01) |
| *A23J 7/00* | (2006.01) |
| *A23K 1/18* | (2006.01) |
| *A23L 1/30* | (2006.01) |

(52) U.S. Cl.
CPC . *A23K 1/164* (2013.01); *A23J 7/00* (2013.01); *A23K 1/1826* (2013.01); *A23L 1/3006* (2013.01)

(58) Field of Classification Search
CPC ..... A23K 1/164; A23K 1/1826; A23L 1/3006
USPC .......... 426/2, 47, 604, 653, 654, 662; 554/78, 554/79, 80
See application file for complete search history.

(56) References Cited

U.S. PATENT DOCUMENTS

| | | | |
|---|---|---|---|
| 4,976,984 | A | 12/1990 | Yasukawa et al. |
| 6,068,997 | A | 5/2000 | Sas et al. |
| 6,190,679 | B1 | 2/2001 | Takekoshi et al. |
| 6,267,985 | B1 | 7/2001 | Chen et al. |
| 6,451,339 | B2 | 9/2002 | Patel et al. |
| 6,509,055 | B1 | 1/2003 | Garnett |
| 6,544,966 | B1 | 4/2003 | Amano et al. |
| 6,720,001 | B2 | 4/2004 | Chen et al. |
| 6,923,988 | B2 | 8/2005 | Patel et al. |
| 7,550,170 | B2 | 6/2009 | Shiiba et al. |
| 8,603,568 | B2 * | 12/2013 | Van Dyck et al. ............ 426/662 |
| 2005/0227945 | A1 | 10/2005 | Schmitt et al. |
| 2010/0196586 | A1 | 8/2010 | Armand et al. |

FOREIGN PATENT DOCUMENTS

| | | |
|---|---|---|
| AT | 397756 B | 6/1994 |
| CN | 1323536 A | 11/2001 |
| DE | 19529861 A1 | 2/1997 |
| EP | 0495441 A2 | 7/1992 |
| GB | 760011 | 10/1956 |
| GB | 816343 | 7/1959 |
| GB | 2267022 A | 11/1993 |
| GB | 2277862 A | 11/1994 |
| GB | 2344736 A | 6/2000 |
| WO | 0033817 A1 | 6/2000 |
| WO | 0036929 A1 | 6/2000 |
| WO | 0149129 A1 | 7/2001 |

OTHER PUBLICATIONS

Sabiha, "Lysophospholipids and their role in enhancing Digestion and Absorption," Avitech Technical Bulletin (online), Sep. 2009 [retrieved on Apr. 26, 2011]. Retrieved from the internet:<URL: http://www.avitechnutrition.com/pdf/technical-bulletin/2009/]; p. 1-6, especially p. 3, col. 2, para 3-4; p. 4, col. 1, para 1-2; p. 5, col. 2, para 4; p. 6, col. 2, para 3-4.
Anonymous, Nutrizyme for improved nutrient digestibility, Internet Inve, Jul. 9, 2004.
Anonymous, Lecithin. Introduction, Internet Norte Products—Compte & Rivera, S. A., Jul. 12, 2004.
Anonymous, Search results for Emulsifiers, Gums & Thickeners, Internet ADM Europe, Jul. 12, 2004.
Pathway Intermediates, Lipidol—The new improved lysolipid additive, Internet Pathway Intermediates, Jul. 27, 2004.
Pathway Intermediates, Lipidol Technical Specification Sheet, Internet Pathway Intermediates, Jul. 27, 2004.
Cargill, Emulfluid NGM, Cargill, Feb. 21, 2006.

\* cited by examiner

*Primary Examiner* — Michele L Jacobson
*Assistant Examiner* — Walter Moore
(74) *Attorney, Agent, or Firm* — Davis, Brown, Koehn, Shors & Roberts, P.C.; Kent A. Herink

(57) ABSTRACT

A specific lecithin composition comprising phospholipids and lysophospholipids is described that can be used as an animal feed additive for the improvement of digestibility parameters and consequently gut health and animal performance. In addition, the mixture possesses useful biological and chemical properties that can be utilized in the animal feed and human food industries. The composition is chemically characterized by means of HPLC-ELSD, HPLC-MS/MS and $^{31}$P-NMR and its biological functionalities are fully described.

6 Claims, No Drawings

METHOD OF IMPROVING ANIMAL FEEDS USING HYDROLYZED LECITHINS

This application is a divisional application of U.S. patent application Ser. No. 13/006,827, filed on Jan. 14, 2011, which claims priority to U.S. Patent Application Ser. No. 61/295,431, filed Jan. 15, 2010, and incorporates the same herein in its entirety, by this reference.

BACKGROUND OF THE INVENTION

The present invention relates generally to feed and food ingredients and, more specifically, to a composition of hydrolyzed lecithins that have markedly improved functionality.

Attempts to improve animal performance have followed a variety of strategies, including efforts to improve digestion and absorption of nutrients. For this purpose, several feed additives based on emulsifiers have been marketed all over the world. There are broadly two categories of products. The first makes use of synthetic emulsifiers, such as ethoxylated ricinoleates, polysorbates, and sorbitan esters. Another class of emulsifiers is natural products such as lecithins. Soybean lecithin is widely used as an additive for animal diets. It is incorporated at levels ranging from 0.1 to 3% and acts to increase the digestibility of fats and their transport out of the liver. In some cases the lecithins are modified by enzymatic hydrolysis to change their functionality.

Lysolecithins, which are structurally related to lecithins can also be used to improve animal performance. Lysolecithins differ from lecithins in the way they exhibit emulsification. Lecithin has a low HLB-value (hydrophilic/lipophilic balance) which promotes oil in water emulsification. Alternatively lysolecithins have a higher HLB value which promotes oil in water emulsification. In the context of nutrient digestion this is an important element as lipids will be emulsified better in the intestinal tract which promotes absorption.

Lysolecithins, in particular lysophosphatidylcholine (LPC), are involved in a variety of important biological processes. Lysophosphatidylcholine is the mono-acyl derivative of phosphatidylcholine (PC) and can be produced by the action of phospholipases. The PC molecule is re-formed by the action of acyl transferase enzymes re-combining the fatty acid chain to the sn-2 position. The cleavage and reformation of this ester bond rather than de novo synthesis is the driver for the exchange dynamic of LPC in living cell membranes.

The precise lysophospholipids to be produced by the enzyme are dependent upon the constituents of the lecithin used as the phospholipid source and the conditions for enzymatic hydrolysis.

Lysophospholipids are known to be involved in regulation of guanylate and adenylate cyclase activity; chemotaxis of human monocytes; chemotaxis of mouse thymus lymphoma cells; activation of human T-lymphocytes and the impairment of endothelium-derived relaxing factor-mediated arterial vasodilation. They are also known to modulate smooth muscle contractility; induce changes to the conformation of calmodulin binding protein; modulate protein kinase-C activity; and stimulate guanosine triphosphatase hydrolysis of the pro-oncogene product p21.

Lysopholids have important and varied roles within biological systems that are precisely dependent on the quantities of lysophospholipids available to the cell, and on the negative feedback processes, which further regulate these concentrations.

SUMMARY OF THE INVENTION

The present invention includes a new hydrolyzed lecithin composition that provides unexpectedly strong additional benefits to the existing products known in the agricultural and food industry. A number of functionalities are discussed using the new and specific composition of phospholipids and lysophospholipids. The formulation provides enhanced functionality when compared with other formulations that are commercially available and/or described in the art.

The formulation can be obtained in several ways. It can be formulated by combining lecithins and lysolecithins that are commercially available. Alternatively it can be formulated from the pure chemical compounds that are obtained from organic synthesis or industrial separation of these compounds in lecithin. Another method is to hydrolyze lecithins or lysolecithins using known methods of enzymatic hydrolysis.

The formulation is characterized by: (a) The relatively low level of phosphorous containing lipids of between about 16% and 32% and preferably approximately 21-24%; (b) the high ratio of lysophospholipids to other phospholipids of between about 1.4:1 and 1:0.6 and preferably approximately 1/1; and (c) the preferred ratios between the four main lysophospholipids LPC, LPI, LPE and LPA, of $4.5\pm1/2.5\pm0.5/2\pm0.5/1\pm0.25$ and all values inside such ranges.

In a preferred embodiment, the formulation provides lysophosphatidylcholine in a molar amount between about $27.71\pm6$, lysophosphatidylinositol in a molar amount between about $15.82\pm5$, lysophosphatidylethanilamine in a molar amount between about $13.65\pm3$, lysophosphatidic acid in a molar amount between about $6.98\pm3$, and other phospholipids in a molar amount between about $35.84\pm10.7$ and all values inside such ranges.

DETAILED DESCRIPTION OF PREFERRED EMBODIMENTS

The identification of all phospholipids and their ratios can be obtained from mainly two analytical techniques. The first one is $^{31}$P-NMR. Different phospholipids can be identified from the chemical shift in the NMR spectrum. Quantification is possible via integration of the signals. Another valuable technique is HPLC. An HPLC system can be used to separate the different components of the phospholipid formulation. A universal detector such as an electron light scattering detector can be used to quantify the concentration of all compounds.

In a preferred embodiment the formulation has the composition specified in Table 1.

TABLE 1

Composition of the phospholipid moiety of a typical formulation expressed as weight percentage and as relative molar composition

| Constituent | Composition | |
|---|---|---|
| | % w/w | % mol/mol |
| LPC (lysophosphatidylcholine) | 5.02 | 27.71 |
| LPI (lysophosphatidylinositol) | 3.17 | 15.82 |
| LPE (lysophosphatidylethanilamine) | 2.26 | 13.65 |
| LPA (lysophosphatidic acid) | 1.06 | 6.98 |
| other phospholipids | 9.98 | 35.84 |
| Sum | 21.49 | 100 |
| Phosphorous | 1.09 | |

Variations in the composition of lecithin depending on the source (soybean, sunflower, etc.) or natural variations between different batches of lecithin or lysolecithin from the same natural source can occur. As the compositions of the present invention can be formulated from these natural products, the ranges for variation for the disclosed formulation are set out in Table 2, which also sets out a similar analysis for two commercial products used for comparison in the examples.

TABLE 2

Composition of the phospholipid moiety of a typical formulation and concentration ranges for the weight percentage and for the relative molar composition

| Product/Constituent | Composition % w/w | Composition % mol/mol |
|---|---|---|
| Current Invention | | |
| LPC | 5.02 ± 1.75 | 27.71 ± 6 |
| LPI | 3.17 ± 1 | 15.82 ± 5 |
| LPE | 2.26 ± 0.5 | 13.65 ± 3 |
| LPA | 1.06 ± 0.5 | 6.98 ± 3 |
| Other phospholipids | 9.98 ± 3 | 35.84 ± 10.7 |
| Sum | 21.49 ± 6.2 | 100 ± 27.7 |
| Phosphorous | 1.09 ± 0.25 | |
| Commercial Product 1 | | |
| LPC | 3.57 ± 0.40 | 12.95 ± 2.04 |
| LPI | 1.08 ± 0.55 | 2.84 ± 0.10 |
| LPE | 2.48 ± 0.38 | 9.46 ± 1.33 |
| LPA | 1.26 ± 0.54 | 6.10 ± 1.41 |
| Other phospholipids | 29.64 ± 1.47 | 68.66 ± 1.29 |
| Sum | 38.08 ± 1.32 | 100 ± 6.17 |
| Commercial Product 2 | | |
| LPC | 3.30 ± 0.25 | |
| LPI | 1.88 ± 0.70 | |
| LPE | 1.98 ± 0.13 | |
| LPA | 0.75 ± 0.04 | |

An artisan can predict that specific deviations from the specified ranges could occur due to natural variation of the lecithins and lysolecithins used to formulate the product without eliminating the functionality of the disclosed formulation.

The formulation is characterized by: (a) The relatively low level of phosphorous containing lipids of between about 16% and 32% and preferably approximately 24%; (b) the high ratio of lysophospholipids to other phospholipids of between about 1.4:1 and 1:0.61 and preferably approximately 1/1; and (c) the specific preferred ratio's between the 4 main lysophospholipids, LPC, LPI, LPE and LPA, as shown in Table 3.

TABLE 3

Prefered ratios of the components in the lysophospholipid fraction and the total lecithin fraction.

| Lysophospholipids | Ratio |
|---|---|
| LPC/LPI/LPE/LPA | 4.5 ± 1/2.5 ± 0.5/2 ± 0.5/1 ± 0.25 |
| LPC/LPI | 2 ± 0.5 |
| LPC/LPE | 2 ± 0.5 |
| LPC/LPA | 4 ± 1.5 |
| LPI/LPE | 1 ± 0.25 |
| LPI/LPA | 3 ± 0.5 |
| LPE/LPA | 2 ± 0.5 |

The preferred ratio of lysophospholipids to phospholipids in the formulation is 1±0.2/1.

Phospholipids and lysophospholipids can have several types of fatty acid chains in the sn-1 and sn-2 position. Phospholipids have two fatty acid chains, whereas lysophospholipids have only one fatty acid chain. The chain length and even more the number of unsaturated bonds in the fatty acid substituents have an important effect on the molecular structure and hence the physicochemical and/or biological properties of the phospholipid or lysophospholipid. The composition of the fatty acid substituents in phospholipids and lysophospholipids can be determined by high performance liquid chromatography combined with triple quadrapole linear ion trap mass spectrometry by a person skilled in the art. The lysophospholipid mixture from current invention is characterized by very high proportions of unsaturated fatty acid substituents in LPC, LPE and LPI compared to the respective lysophospholipids in typical soy lecithin (Table 4). The absolute levels of saturated fatty acid substituents in native lysophospholipids from soy lecithin remain remarkably constant after hydrolysis, but the weight percentage of polyunsaturated fatty acid substituents is increased several-fold. The ratio of polyunsaturated fatty acids to saturated fatty acids for all lysophospholipid fractions was at least 5. The level and type of fatty acid substituents in the phospholipids is not relevant, as the remaining phospholipids in the hydrolyzed lecithin have essentially the same molecular structure and hence physicochemical properties as in the native lecithin. Any person skilled in the art could propose an analogous rationale based on molecular fractions instead of weight percentages, but would achieve similar conclusions, because the molecular weights of saturated and unsaturated fatty acids are almost equal and the amount of C18 fatty acid is highly exceeding the fraction of C16 fatty acids.

TABLE 4

Absolute and relative levels of fatty acid substituents (SFA, saturated fatty acids; UFA, unsaturated fatty acids; PUFA, polyunsaturated fatty acids) in lysophospholipids as a weight percentage in lecithin and hydrolysed lecithin

| Fraction | Fatty acid substituents | Typical soy lecithin | Hydrolyzed lecithin of the current invention |
|---|---|---|---|
| LPC | SFA (C16:0 and C18:0), (w/w)% | 0.174 | 0.171 |
| | UFA (C16:1 and C18:1), (w/w)% | 0.157 | 0.584 |
| | PUFA (C18:2 and C18:3), (w/w)% | 0.480 | 1.796 |
| | Ratio PUFA:SFA | 2.8 | 10.5 |
| LPE | SFA (C16:0 and C18:0), (w/w)% | 0.111 | 0.057 |
| | UFA (C16:1 and C18:1), (w/w)% | 0.070 | 0.278 |
| | PUFA (C18:2 and C18:3), (w/w)% | 0.269 | 1.050 |
| | Ratio PUFA:SFA | 2.4 | 18.4 |
| LPI | SFA (C16:0 and C18:0), (w/w)% | 0.349 | 0.325 |
| | UFA (C16:1 and C18:1), (w/w)% | 0.081 | 0.323 |
| | PUFA (C18:2 and C18:3), (w/w)% | 0.423 | 2.330 |
| | Ratio PUFA:SFA | 1.2 | 7.2 |

Dosage

Hydrolyzed lecithin, also known as lysolecithins, is typically dosed between 25 g and 1000 g per metric ton of feed. In a preferred embodiment between 50 and 250 gram is dosed per metric ton of feed.

Combination with Carriers

Lysolecithins can be dosed as such by spraying the product on feed. Liquid carriers can be used to dilute the product in order to promote the homogenous distribution in the feed.

Alternatively a dry product can be obtained by mixing the lysolecithin formulation with suitable carriers such as silica gel, limestone, vegetable fibers, salts, bentonite and the like. An antioxidant can be added to protect the lipids against oxidation due to the increased surface of dry products.

Example 1

The formulation was tested to identify its potential to improve the emulsification and absorption of lipids and consequently the digestibility of the fats in the diet. A metabolic trial with broilers was used for this purpose Trial Set-Up A total of 84 one-day old male Ross 308 broiler chickens were used in a digestibility trial that was conducted, and consisted of a 7-day period of adaptation to the respective experimental diets starting at the age of 14 days followed by a 4-day main balance period (21-25 days of age) with ad libitum feeding and total excreta collection. From day 1 to 14, the birds were housed on deep litter under conventional conditions for lighting, heating and ventilation. From day 14 to 24, the birds were housed in individual balance cages, consisting of a wire floor (a plastic tray for total excreta collection placed under the floor), and drinking cup and feed trough in front. Feed and drinking water were provided ad libitum. On day 14, the birds were weighed individually; birds having relatively high or low body weights were discarded. The birds (at 14 days of age) were assigned randomly to each of the 84 individual digestibility cages (adaptation period). On day 21, an additional selection was carried out in order to reduce the number of cages from 12 to 10 for each treatment. For each treatment (n=7), 10 replicates were used. During the main period (21-25 days of age), the birds were fed ad libitum level, while water was freely available. The balance trial (main period) lasted for eleven days, divided into two periods. Preliminary period to adapt the birds to iron cages (7 d) and excreta collection period (4 d) which started and finished by 12 h starvation. In the proper period, excreta were collected two times per day and immediately frozen. During the excreta collection period, feed intake was strictly recorded. The composition and nutritive value of the examined mixtures are presented in Tables 5 and 6.

TABLE 5

Composition (%) of the diet (g/kg)
Grower Diet

| Components | Inclusion rate (g/kg) |
|---|---|
| Maize | 170.00 |
| Wheat | 441.60 |
| dl-methionine | 2.90 |
| L Lysine HCL | 3.70 |
| L Threonine | 1.40 |
| Limestone | 10.00 |
| Monocalcium phosphate | 14.70 |
| Soybean meal 46% | 246.00 |
| NaCl | 1.40 |
| Na-Bicarbonate | 3.30 |
| Rapeseed meal | 30.00 |
| Pig fat (lard) | 40.00 |
| Soybean oil | 20.00 |
| Premix (1%) | 10.00 |
| Premix of the test additives | 5.00 |

TABLE 6

Nutritive value of the diet (g/kg)
Nutrient content of diets (g · kg$^{-1}$)

| | |
|---|---|
| ME (kcal/kg) | 3085 |
| N × 6.25 | 190.81 |
| Lysine | 11.96 |
| Methionine | 0.57 |
| Ca | 12.10 |
| P$_{available}$ | 5.30 |
| Na | 2.20 |
| fat | 79.70 |

The animals were subjected to the usual health and vaccination program. The animals were subjected to a 23L/1D light schedule.

Analyses and Calculations

After the balance trial and prior to the analyses, the excreta samples were homogenized using a stomacher homogenizer (Interscience, Paris, France), freeze-dried using a Christ 1825 Medizinische apparatebau 326 (Martin Christ, Osterode, Germany), and ground (0.5 mm screen). Samples of feeds and freeze-dried excreta were analyzed for nitrogen (Kjeldahl method: crude protein=N×6.25), crude fat and gross energy (GE: adiabatic calorimetry). The digestibility of nutrients was determined by the classical balance method. The quantity of nutrients from the feed was decreased by the amount excreted in feces, and this gave the amount of digested components. The ratio of digested constituents to those intake expressed in percent indicated the level of apparent digestibility coefficients. The AME values were calculated by subtracting the GE (gross energy) intake from the GE excreta and then dividing these values by the GE intake. AME$_n$ was calculated by the following equation:

$$AME_n = \frac{(\text{Feed Gross Energy}) - ([\text{fecal+urinary}]\text{energy})}{N},$$

where $[\text{fecal+urinary}]\text{energy}_N = ([\text{fecal+urinary}]\text{energy}) + 34.36$ (N intake−[fecal+urinary]N) and where 34.36 kJ/kg is the mean gross energy of the nitrogenous execratory products in the bird.

Treatment effects were compared using the analysis of variance and treatment means were separated using the least significant difference. The computation was done using the SAS® program version 9.1 (Statistical Analysis System Institute, Cary, N.C.).

Products Tested

All tested formulations, including the blank that served as a negative control, were incorporated in a premix that was dosed at 5 kg per ton of feed. The premix included enzymes, a mycotoxin binder and carrier material (premix base). All tested products were incorporated in the premix at a dosage of 500 g. The composition and code of the formulations is shown in Table 7.

TABLE 7

Description of the treatments.

| | Code and composition of treatment (%) | | | | | |
|---|---|---|---|---|---|---|
| Ingredient | T-0 | T-1 | T-2 | T-3 | T-4 | T-5 |
| Commercial Product 1 | | 50 | | | | 25 |
| Commercial Product 2 | | | 50 | | | |
| Disclosed formulation | | | | 50 | | |
| Synthetic emulsifier | | | | | 50 | 25 |
| Premix base | 100 | 50 | 50 | 50 | 50 | 50 |

Besides a control group (T-0) in which the space in the formulations was replaced with 500 g of the carrier, there were five treatments.

In T-1 and T-2 other commercially available lysolecithins have been included in the diet. Treatment 3 is based on the disclosed formulation, T-4 includes a synthetic emulsifier, ethoxylated ricinoleate, and T-5 is a combination of the synthetic emulsifier with lysolecithins.

Results

The results are presented in Table 8.

TABLE 8

Nutrient digestibility, Excrements/Feed ratio and $AME_n$ for examined diets for all treatments with the respective Standard Error (SE)

| Groups | Digestibility coefficient for dry matter | Digestibility coefficient for crude protein | Digestibility coefficient for crude fat. | $AME_n$ (kcal/kg) | Excrements/Feed ratio |
|---|---|---|---|---|---|
| T-0 | 71.97$^a$ | 90.92$^a$ | 86.34$^a$ | 3003.6$^a$ | 0.97$^a$ |
| SE | (0.67) | (0.22) | (1.22) | (30.66) | (0.03) |
| T-1 | 72.98$^a$ | 91.17$^{ab}$ | 88.86$^{abc}$ | 3051.5$^{ab}$ | 0.85$^b$ |
| SE | (0.51) | (0.22) | (0.64) | (20.86) | (0.03) |
| T-2 | 73.30$^a$ | 91.49$^b$ | 88.65$^{abc}$ | 3085.5$^{bc}$ | 0.89$^{ab}$ |
| SE | (0.50) | (0.19) | (0.90) | (23.28) | (0.03) |
| T-3 | 75.21$^b$ | 91.33$^{ab}$ | 88.25$^{ab}$ | 3178.1$^d$ | 0.76$^c$ |
| SE | (0.68) | (0.17) | (1.01) | (30.83) | (0.02) |
| T-4 | 72.58$^a$ | 91.16$^{ab}$ | 89.05$^{bc}$ | 3001.9$^a$ | 0.90$^{ab}$ |
| SE | (0.68) | (0.29) | (1.10) | (30.66) | (0.03) |
| T-5 | 72.89$^a$ | 91.54$^b$ | 89.35$^{bc}$ | 3052.2$^{ab}$ | 0.87$^b$ |
| SE | (0.47) | (0.15) | (0.84) | (20.77) | (0.02) |

$^{abc}$Means in the columns with different letters are significantly different at P ≤ 0.05

For dry mater digestibility, the best results were observed for the group III, which included the disclosed formulation. This group was characterized by statistically significantly higher results in dry mater digestibility in comparison to all other groups (p≤0.05). The lowest dry matter digestibility was observed for the control group.

Statistically significant differences were observed in crude protein digestibility between the groups II (commercial lysolecithin formulation 2) and V (a combination of a commercial lysolecithin and a synthetic emulsifier) (p≤0.05). In this experiment, a positive numerical trend for crude protein digestibility was observed in groups I, III, IV.

The improvement of crude fat digestibility was statistically significant compared to the control group for groups IV and V (p>0.05).

In apparent metabolizable energy corrected to zero-nitrogen retention ($AME_n$) the lowest performance was observed in groups 0 and IV. The best results with regard to this parameter were observed in groups II and III. This improvement was statistically significant.

Excrements to feed intake ratio in trial was statistically significantly higher in the control group, showing sub-optimal digestibility. Significant improvements were observed for groups I, III and V.

Conclusion

In conclusion it can be observed that the disclosed formulation brings about a completely different digestibility profile. Compared to the other lysolecithins in the trial, the digestibility for crude fat was numerically the lowest, while there was a very significant difference for both the digestibility of dry matter and excrements to feed ratio. In total this resulted in a significantly higher $AME_n$ for the disclosed formulation compared to all other treatments.

These results illustrate the superior improvement of digestibility by the disclosed formulation. Furthermore the mode of action is clearly different as a new digestibility profile is observed compared to other lysolecithins. This mode of action is also unexpected since lysolecithins are known as emulsifiers which promote fat digestion absorption. The disclosed formulation clearly does not show this predicted effect.

Example 2

Materials and Methods

Experimental products. Two different sources of lysophospholipids were used in the trial. Commercial Product 1 from Example 1 was used as an example of a standard lysophospholipid mixture. The product was added to the feed as a premixture, which is further indicated as LB I. This premixture contained 50% (w/w) Commercial Product 1, 30% (w/w) silica and 20% (w/w) limestone. A novel lysophospholipid composition, designated LC liquid, was produced according to the present invention. The product was added to the feed as an alternative, lysophospholipid containing premixture, further indicated as LB II. This alternative premixture contained 25% (w/w) LC liquid, 30% (w/w) silica and 45% (w/w) limestone. The chemical composition of both lysophospholipid sources was determined by $^{32}$P-NMR (Spectral Service, Germany) and is given in Table 9.

TABLE 9

Chemical composition of the lysophospholipid mixtures determined by $^{32}$P-NMR (Spectral Service, Germany)

| | | Commercial Product 1 | | LC liquid | |
|---|---|---|---|---|---|
| | MW | % w/w | mol-% | % w/w | mol-% |
| Lysophosphatidyl choline | 515 | 3.17 | 10.90 | 5.27 | 21.51 |
| Lysophosphatidyl inositol (LPI) | 570 | 0.91 | 2.85 | 2.10 | 7.76 |
| Lysophosphatidyl ethanolamine | 470 | 2.85 | 10.79 | 2.87 | 12.86 |
| Lysophosphatidic acid (LPA) | 430 | 1.55 | 6.42 | 1.72 | 8.43 |
| Other phospholipids | 770 | 30.11 | 69.04 | 18.37 | 49.44 |
| Total phospholipids | | 38.59 | 100.00 | 30.33 | 100.00 |
| Total phosphorus | | 1.74 | | 1.47 | |

Diet Formulation.

Feed batches were manufactured by grinding maize and wheat using a Skiold disc mill with disc distances set at 1 mm for wheat and maize. The experimental products LB I and LB II were premixed with 10 kg wheat separately for each treatment. The trial was divided in to three feeding periods: starter (0-11d), grower (12-20d) and finisher (from 21 to 28 days). The composition of the experimental diets and the calculated value are presented in Table 10. The diets used in the trial were offered in mash form and available ad libitum. Antibiotic growth promoters and cocciodiostats were not used in the diets. The final feeds were manufactured in horizontal mixers with a capacity of 0.60 tonne with precision 1:10 000. Basal diets for the three experimental periods were prepared by single mixing.

Husbandry Conditions.

The trial was carried out at the POZNAN University of Life Sciences, Department of Animal Nutrition and Feed Management, Poland. The trial facility was located in the station at Gorzyń/Miedzychód, Poland. The housing management, feeding and husbandry conditions used in the POZNAN University facility were regarded as representative for a modern commercial broiler operation in Europe and were similar to those used in Example 1. The trial was carried out with 120 one day old Ross 308 chicken broilers. The total treatment duration was 28 days with a 3 phase feeding system (starter, grower and finisher). The animals were obtained from a breeding farm without disease problems. The birds were weighed and assigned to the dietary treatments in order to achieve maximum possible homogeneity within each group and minimum differences between all trial groups. From 0 to 14 days birds were reared as a group outside metabolic cages. At 14 days birds were randomly allocated to one of 120 cages. Each cage contained one bird. Each cage was allocated to one of the six dietary treatments detailed in Table 11, resulting in 20 cages per treatment comprising 10 cages with female birds and 10 cages of male birds. The balance period for digestibility study compromising total excreta collection occurred from day 24 to day 28. The excreta collection period started and finished with 12 h starvation. Also during this period feed intake and will be strictly recorded and birds weighted at beginning and ending of the period. The excreta collection was performed two 2 times per day and samples were be immediately frozen for posterior analysis.

Nutritional Analysis of the Diets.

Starter, grower and finisher diets were analyzed according to AOAC methods for dry matter, crude protein, fat and NDF. Gross energy was determined using a bomb calorimeter with benzoic acid as a standard.

Environment Control.

Environmental conditions (maximum and minimum temperature) and humidity were recorded daily using electronic equipment. Each room was equipped with two condition recorders allocated on opposite walls. Environmental temperatures in the room were modified during the trial according to the recommendations. The condition of the experimental animals and litter was observed twice per day.

Digestibility and $AME_n$ Level Measurement.

Samples of feeds and freeze-dried excreta were analysed for nitrogen (Kjeldahl method: crude protein=N×6.25), crude fat and gross energy (GE: adiabatic calorimetry). The digestibility of nutrients was determined by the classical balance method. The quantity of nutrients from the feed was decreased by the amount excreted in faeces, and this gave the amount of digested components. The ratio of digested constituents to the intake expressed as a percentage indicated the level of apparent digestibility coefficients. The AME values were calculated as in Example 1.

Statistical Analysis of Data.

Statistical differences between experimental diets were evaluated by analysis of variance using the GLM procedure of SAS (SAS Inst. Inc., Cary, N.C., U.S.) according following formula:

$$Y_{ij} = \mu + \alpha_i + \epsilon_{ij}$$

where $Y_{ij}$ is the observed dependent variable, $\alpha_i$ represents the effect of the diet, and $\epsilon_{ij}$ represents the random error. Differences among diet means were determined using a Duncan means comparison when the significance of the model was $P<0.05$.

TABLE 10

Composition of the standard (T0-T3) and reformulated (T4-T5) basal diets and calculated nutritional values (starter 0-11 d, grower 12-21 d, finisher 22-28 d)

| | | T0-T3 | | | T4-T5 | | |
|---|---|---|---|---|---|---|---|
| | | Starter | Grower | Finisher | Starter | Grower | Finisher |
| Maize | % | 36.52 | 39.9 | 46.55 | 38.28 | 41.1 | 47.86 |
| Wheat | % | 15 | 15 | 15 | 15 | 15 | 15 |
| Soybean meal 44% | % | 38.6 | 34.5 | 28.51 | 38.14 | 34.2 | 28.3 |
| Soybean Oil | % | 5.4 | 6.7 | 3.3 | 4.1 | 5.8 | 2.6 |
| Animal fat | % | — | — | 3.0 | — | — | 2.6 |
| Lysine | % | 0.3 | 0.3 | 0.18 | 0.3 | 0.3 | 0.18 |
| Methionine | % | 0.16 | 0.13 | 0.1 | 0.16 | 0.13 | 0.1 |
| Threonine | % | 0.17 | 0.17 | 0.15 | 0.17 | 0.17 | 0.15 |
| Limestone | % | 0.8 | 0.55 | 0.46 | 0.8 | 0.55 | 0.46 |
| Monocalcium phosphate | % | 1.6 | 1.4 | 1.3 | 1.6 | 1.4 | 1.3 |
| NaHCO$_3$ | % | 0.1 | 0.1 | 0.1 | 0.1 | 0.1 | 0.1 |
| Salt | % | 0.35 | 0.35 | 0.35 | 0.35 | 0.35 | 0.35 |
| Vitamins and minerals[1] | % | 1 | 1 | 1 | 1 | 1 | 1 |
| | | Calculated nutritional values | | | | | |
| Crude protein | % | 23.0 | 21.5 | 19.5 | 22.98 | 21.49 | 19.53 |
| Ca | % | 1.054 | 0.913 | 0.846 | 1.054 | 0.912 | 0.843 |
| P, available | % | 0.508 | 0.457 | 0.425 | 0.508 | 0.458 | 0.428 |
| Na | % | 0.189 | 0.189 | 0.187 | 0.190 | 0.189 | 0.188 |
| Total methionine | % | 0.517 | 0.46 | 0.415 | 0.518 | 0.46 | 0.417 |
| Total Lysine | % | 1.42 | 1.24 | 1.09 | 1.42 | 1.24 | 1.09 |
| AMEn | MJ/kg | 12.7 | 13.2 | 13.4 | 12.4 | 13.0 | 13.2 |
| | kcal/kg | 3035 | 3155 | 3203 | 2964 | 3107 | 3155 |

[1]Each kg of feed contains per label: vit. A: 10.000 UI; vit. D3: 2.800 UI; vit. E: 36 mg; Cu: 25 mg

TABLE 11

| | | Dietary treatments | |
|---|---|---|---|
| Code | Dietary treatment | Dose of lysophospholipid mixture in finished feed | Dose of LPC in finished feed |
| T0 | Standard diet | — | — |
| T1 | Standard diet + LB I 250 g/mt | Commercial Product 1 125 g/mt | 3.96 g/mt |
| T2 | Standard diet + LB I 500 g/mt | Commercial Product 1 250 g/mt | 7.92 g/mt |
| T3 | Standard diet + LB II 500 g/mt | LC liquid 125 g/mt | 6.59 g/mt |
| T4 | Reformulated diet + LB I 500 g/mt | Commercial Product 1 250 g/mt | 7.92 g/mt |
| T5 | Reformulated diet + LB II 500 g/mt | LC liquid 125 g/mt | 6.59 g/mt |

Results

Nutrient Digestibilities and $AME_n$ Levels of Male Birds.

Improvements in fat digestibility were observed due to the addition of lysophospholipids. Nitrogen retention was affected both by LB I and LB II ($P<0.05$) compared to the standard diet. All experimental groups were characterized by a higher nitrogen retention than the group fed the standard diet ($P<0.50$). Better nitrogen retention was also observed for the birds that received the reformulated diets. Use of LB I at 250 g/mt and 500 g/mt and LB II at 500 g/mt significantly improved AMEn compared to the standard diet. Similar responses ($P<0.05$) were observed for the reformulated diets.

TABLE 12

Digestibility of dry mater (DM), organic dry matter (ODM), crude fat (CF), crude fiber (CFi), neutral detergent fiber (NDF), nitrogen retention (N) and apparent metabolizable energy ($AME_n$) by male birds

|  | DM | ODM | CF | CFi | NDF | N | $AME_n$ |
|---|---|---|---|---|---|---|---|
| Standard diet | 69.7 | 71.5 | 85.1 | 27.9 | 21.2 | 87.9 b | 2988 b |
| Standard diet + LB I 250 g/mt | 71.0 | 72.9 | 87.8 | 29.8 | 23.5 | 89.3 a | 3128 a |
| Standard diet + LB I 500 g/mt | 72.8 | 74.6 | 88.1 | 33.1 | 28.4 | 90.3 a | 3158 a |
| Standard diet + LB II 500 g/mt | 72.2 | 74.1 | 86.8 | 29.6 | 25.4 | 90.0 a | 3176 a |
| Reformulated diet + LB I 500 g/mt | 71.8 | 73.6 | 87.0 | 31.8 | 25.5 | 89.6 a | 3186 a |
| Reformulated diet + LB II 500 g/mt | 71.9 | 73.8 | 86.5 | 30.6 | 24.6 | 90.2 a | 3124 a |
| SEM | 0.414 | 0.403 | 0.337 | 0.888 | 0.952 | 0.190 | 18.34 |
| P | 0.353 | 0.298 | 0.135 | 0.658 | 0.400 | 0.001 | 0.017 |

*Means in a column which are significantly different a P ≤ 0.05 are indicated by different letters Nutrient Digestibilities and $AME_n$ Levels of Female Birds.

Nitrogen retention and AMEn were affected by the additives (P<0.05). The lowest nitrogen retention was observed in the case of standard diet (P<0.05). The other experimental groups did not differ significantly from each other. Similarly, AMEn in diets supplemented with lysophospholipids did not differ significantly from each other, but all were significantly higher than the unsupplemented standard diet.

Diet Formulation and Analysis.

The nutritional composition of the experimental diets is given in Table 14. The analyzed values for crude protein were in line with the calculated values given previously in Table 10.

Health and Condition.

The consistency of the feces during whole trial was normal, no sticky droppings or diarrhoea problems were observed. There were no differences between dietary treatments. There was no mortality during this experiment.

TABLE 13

Digestibility of dry mater (DM), organic dry matter (ODM), crude fat (CF), crude fiber (CFi), neutral detergent fiber (NDF), nitrogen retention (N) and apparent metabolizable energy ($AME_n$) by female birds

|  | DM | ODM | CF | CFi | NDF | N | $AME_n$ |
|---|---|---|---|---|---|---|---|
| Standard diet | 70.0 | 71.8 | 85.9 | 26.3 | 21.9 | 87.9 b | 2997 b |
| Standard diet + LB I 250 g/mt | 71.9 | 73.4 | 87.8 | 29.9 | 23.7 | 89.8 a | 3161 a |
| Standard diet + LB I 500 g/mt | 72.0 | 74.2 | 88.5 | 30.9 | 27.1 | 89.8 a | 3165 a |
| Standard diet + LB II 500 g/mt | 71.9 | 73.8 | 88.6 | 29.2 | 25.6 | 89.6 a | 3184 a |
| Reformulated diet + LB I 500 g/mt | 71.7 | 73.8 | 87.1 | 31.0 | 24.3 | 89.3 a | 3193 a |
| Reformulated diet + LB II 500 g/mt | 71.6 | 73.7 | 87.5 | 31.1 | 25.2 | 90.3 a | 3134 a |
| SEM | 0.450 | 0.447 | 0.355 | 0.776 | 0.748 | 0.179 | 17.38 |
| P | 0.802 | 0.745 | 0.260 | 0.459 | 0.463 | 0.001 | 0.008 |

*Means in a column which are significantly different a P ≤ 0.05 are indicated by different letters

TABLE 14

Nutritional composition of the experimental diets

| | | T0 | T1 | T2 | T3 | T4 | T5 |
|---|---|---|---|---|---|---|---|
| Starter | Gross Energy | 4274 | 4298 | 4304 | 4369 | 4280 | 4298 |
| | Dry Matter | 89.99 | 90.15 | 90.26 | 90.29 | 90.16 | 90.20 |
| | Crude Protein | 21.88 | 22.36 | 22.58 | 22.81 | 22.72 | 22.98 |
| | Crude Fat | 7.2 | 7.3 | 7.8 | 7.7 | 6.61 | 6.38 |
| | Crude fibre | 3.3 | 3.27 | 4.00 | 4.00 | 4.12 | 3.46 |
| | NDF | 8.01 | 7.69 | 8.43 | 7.87 | 8.35 | 8.12 |
| Grower | Gross Energy | 4443 | 4441 | 4456 | 4425 | 4433 | 4401 |
| | Dry Matter | 90.16 | 90.25 | 90.14 | 90.15 | 90.02 | 90.03 |
| | Crude Protein | 21.36 | 22.06 | 21.49 | 21.79 | 21.04 | 21.02 |
| | Crude Fat | 8.75 | 8.98 | 9.09 | 8.96 | 8.33 | 8.54 |
| | Crude fibre | 3.79 | 3.86 | 3.28 | 3.12 | 3.44 | 3.40 |
| | NDF | 8.28 | 8.63 | 8.41 | 8.26 | 8.31 | 8.16 |
| Finisher | Gross Energy | 4448 | 4429 | 4429 | 4469 | 4488 | 4390 |
| | Dry Matter | 90.53 | 90.38 | 90.36 | 90.53 | 90.45 | 90.54 |
| | Crude Protein | 19.01 | 18.56 | 18.63 | 18.65 | 18.18 | 18.19 |
| | Crude Fat | 9.10 | 9.11 | 8.98 | 8.93 | 8.18 | 7.98 |
| | Crude fibre | 3.54 | 3.49 | 3.47 | 3.02 | 3.09 | 3.26 |
| | NDF | 8.12 | 8.57 | 8.87 | 8.87 | 8.26 | 8.08 |

Discussion

Commercial Product 1 (LB I) and LC liquid are both lysophospholipid sources, but differ from each other in several parameters. LPC, LPI and LPA concentrations are significantly higher in LC liquid, while the level of LPE is comparable in both products. The level of total phospholipids, however, is significantly higher in Commercial Product 1, due to the presence of unhydrolyzed phospholipids such as PC, PI, PE and PA. Since the lysophospholipid forms are the active compounds, the inclusion rate of the test products was based on lysophospholipid contents.

Remarkably, all lysophospholipid additions resulted in significant improvements in nitrogen retention both in male and female birds fed the standard finisher feed. The increase in nitrogen retention of 2.1% (90.0% minus 87.9%, Table 12) compared to the standard diet by use of LC liquid at 125 g/mt in male broilers is equivalent to 0.688 g nitrogen more retained in the bird per kilogram of feed consumed, assuming a crude protein content of 215 g/kg. This nitrogen saving represents a contribution of 23.9 kJ or 5.7 kcal in the calculation of $AME_n$. In contrast, the total $AME_n$ gain observed is 188 kcal (3176 kcal minus 2988 kcal, Table 12) for the same treatment. The increase in nitrogen retention is hence only a limited portion of the total $AME_n$ gain observed. An increase of dry matter digestibility with 2.5% for a feed with a dry matter content of 900 g/kg would represent an $AME_n$ gain of approximately 90 kcal/kg. An increase of fat digestibility with 1.7% for a feed with a fat content of 75 g/kg would represent an $AME_n$ gain of 18 kcal/kg. The important increase in $AME_n$ by use of lysolecithin is therefore only partially due to the savings in nitrogen efficiency, and for the remainder part due to the combined effect of improvement in several nutrient fractions.

For the reformulated finisher feed, the calculated energy of the reformulated diet was only 48 kcal lower than the standard diet (Table 9). The observed $AME_n$ gains due to lysophospholipid inclusion (Tables 12 and 13) was significantly higher than this amount, and consequently resulted in $AME_n$ values that were significantly higher than the standard diet without lysophospholipids. When the apparent energy values of the lysophospholipid sources are calculated based on the $AME_n$ gains observed in the trial (Table 14), the highest values were obtained for both diets and both male and female birds for LC liquid. Since the additional energy gain due to increasing the inclusion Commercial Product 1 (LB I) from 125 to 250 g/mt is limited, the apparent energy value of LC liquid at 62.5 g/mt is expected to be even higher.

TABLE 15

Apparent energy values of lysophospholipid source

| Dietary treatment | AMEn value (kcal/kg) in standard diet | | AMEn value (kcal/kg) in reformulated diet | |
| --- | --- | --- | --- | --- |
| | males | females | males | females |
| LB I 125 g/mt | 1120 | 1312 | | |
| LB I 250 g/mt | 680 | 672 | 984 | 976 |
| LC liquid 125 g/mt | 1504 | 1496 | 1472 | 1480 |

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. An improved method of feeding an animal, comprising the steps of:
    (a) providing an animal feed having a level of dry matter digestibility;
    (b) adding to the animal feed a mixture of phospholipids and lysophospholipids, wherein the level of phosphorus-containing lipids is greater than 16% and less than 32%, and comprising a weight ratio of lysophospholipids to phospholipids between about 0.6/1 and about 1.4/1 and wherein the lysophospholipids include lysophosphatidylcholine, lysophosphatidylinositol, lysophosphatidylethanilamine, and lysophosphatidic acid present in a weight ratio of lysophosphatidylcholine to lysophosphatidylinositol to lysophosphatidylethanilamine to lysophosphatidic acid of between 4.5±1 to 2.5±0.5 to 2±0.5 to 1±0.25 to create a treated animal feed; and
    (c) feeding the treated animal feed to an animal resulting in improved dry matter digestibility.

2. The method of claim 1, wherein the lysophospholipids include lysophosphatidylcholine, lysophosphatidylethanolamine, and lysophosphatidylinositol having both polyunsaturated fatty acid substituents and saturated fatty acid substituents and wherein the weight percentage of polyunsaturated fatty acid substituents in lysophosphatidylcholine, lysophosphatidylethanolamine, and lysophosphatidylinositol, respectively, is at least 5 times higher than the weight percentage of saturated fatty acid substituents.

3. An improved method of feeding an animal, comprising the steps of:
    (a) providing an animal feed having a level of apparent metabolizable energy corrected to zero-nitrogen retention;
    (b) adding to the animal feed a mixture of phospholipids and lysophospholipids, wherein the level of phosphorus-containing lipids is greater than 16% and less than 32%, comprising a weight ratio of lysophospholipids to phospholipids between about 0.6/1 and about 1.4/1 and wherein the lysophospholipids include lysophosphatidylcholine, lysophosphatidylinositol, lysophosphatidylethanilamine, and lysophosphatidic acid present in a weight ratio of lysophosphatidylcholine to lysophosphatidylinositol to lysophosphatidylethanilamine to lysophosphatidic acid of between 4.5±1 to 2.5±0.5 to 2±0.5 to 1±0.25 to create a treated animal feed; and
    (c) feeding the treated animal feed to an animal resulting in improved apparent metabolizable energy corrected to zero-nitrogen retention.

4. The method of claim 3, wherein the lysophospholipids include lysophosphatidylcholine, lysophosphatidylethanolamine, and lysophosphatidylinositol having both polyunsaturated fatty acid substituents and saturated fatty acid substituents and wherein the weight percentage of polyunsaturated fatty acid substituents in lysophosphatidylcholine, lysophosphatidylethanolamine, and lysophosphatidylinositol, respectively, is at least 5 times higher than the weight percentage of saturated fatty acid substituents.

5. A method of reducing the ratio of excrements to feed of an animal fed an animal feed, comprising the steps of:
    (a) providing an animal feed;
    (b) adding to the animal feed a mixture of phospholipids and lysophospholipids, wherein the level of phosphorus-containing lipids is greater than 16% and less than 32%, comprising a weight ratio of lysophospholipids to phospholipids between about 0.6/1 and about 1.4/1 and wherein the lysophospholipids include lysophosphatidylcholine, lysophosphatidylinositol, lysophosphatidylethanilamine, and lysophosphatidic acid present in a weight ratio of lysophosphatidylcholine to lysophosphatidylinositol to lysophosphatidylethanilamine to lysophosphatidic acid of between 4.5±1 to 2.5±0.5 to 2±0.5 to 1±0.25 to create a treated animal feed; and (c) feeding the treated animal feed to an animal resulting in reducing the ratio of excrements to feed of the animal fed the treated animal feed.

6. The method of claim 5, wherein the lysophospholipids include lysophosphatidylcholine, lysophosphatidylethanolamine, and lysophosphatidylinositol having both polyunsaturated fatty acid substituents and saturated fatty acid substituents and wherein the weight percentage of polyunsaturated fatty acid substituents in lysophosphatidylcholine, lysophosphatidylethanolamine, and lysophosphatidylinositol, respectively, is at least 5 times higher than the weight percentage of saturated fatty acid substituents.

* * * * *